United States Patent
Bonutti et al.

(10) Patent No.: US 11,637,479 B2
(45) Date of Patent: Apr. 25, 2023

(54) WAVE ENERGY HARVESTER

(71) Applicant: P Tech, LLC, Effingham, IL (US)

(72) Inventors: Peter M. Bonutti, Manalapan, FL (US); Matthew J. Cremens, Effingham, IL (US); Justin E. Beyers, Effingham, IL (US); Tonya M. Bierman, Dieterich, IL (US)

(73) Assignee: P TECH, LLC, Manalapan, FL (US)

( * ) Notice: Subject to any disclaimer, the term of this patent is extended or adjusted under 35 U.S.C. 154(b) by 0 days.

(21) Appl. No.: 17/138,517

(22) Filed: Dec. 30, 2020

(65) Prior Publication Data

US 2021/0203209 A1 Jul. 1, 2021

Related U.S. Application Data

(60) Provisional application No. 62/955,142, filed on Dec. 30, 2019.

(51) Int. Cl.
| | | |
|---|---|---|
| *H02K 7/18* | (2006.01) | |
| *F03B 13/08* | (2006.01) | |
| *F03B 13/10* | (2006.01) | |
| *F03B 13/14* | (2006.01) | |
| *H02K 11/04* | (2016.01) | |
| *H02K 3/22* | (2006.01) | |

(52) U.S. Cl.
CPC .......... *H02K 7/1876* (2013.01); *F03B 13/08* (2013.01); *F03B 13/10* (2013.01); *F03B 13/14* (2013.01); *H02K 3/22* (2013.01); *H02K 11/046* (2013.01); *F05B 2220/706* (2013.01)

(58) Field of Classification Search
CPC ...... H02K 7/1876; H02K 3/22; H02K 11/046; H02K 35/02; F03B 13/14; F03B 13/08; F03B 13/10; F05B 2220/706
See application file for complete search history.

(56) References Cited

U.S. PATENT DOCUMENTS

| | | |
|---|---|---|
| 7,199,481 B2 | 4/2007 | Hirsch |
| 7,323,790 B2 | 1/2008 | Taylor |
| 7,964,977 B2 * | 6/2011 | Nair ...................... H01L 41/125 |
| | | 290/42 |
| 8,067,849 B2 | 11/2011 | Stewart |
| 8,350,394 B2 | 6/2013 | Cottone et al. |
| 8,629,572 B1 | 1/2014 | Phillips |
| 9,435,316 B2 | 9/2016 | Chen et al. |
| 10,047,717 B1 | 8/2018 | Phillips |
| 2005/0174817 A1 | 8/2005 | Schmidt et al. |
| 2008/0195255 A1 | 8/2008 | Lutze et al. |
| 2009/0251258 A1 | 10/2009 | Rhinefrank et al. |
| 2009/0278358 A1 | 11/2009 | Lemieux |
| 2010/0109329 A1 | 5/2010 | Brantingham |
| 2010/0123313 A1 | 5/2010 | Hobdy |
| 2011/0278848 A1 | 11/2011 | Gimsa |
| 2012/0032444 A1 | 2/2012 | Burton |

(Continued)

*Primary Examiner* — Joseph Ortega
(74) *Attorney, Agent, or Firm* — Stinson LLP

(57) ABSTRACT

A linear generator includes one or more helices, and one or more magnet members movable relative to a first helix to generate electric energy within the first helix. The first helix includes a first coil. The first helix and/or the magnet members have a density less than that of water such that the first helix and/or the magnet members have buoyant properties when the linear generator is at least partially submerged in the water.

17 Claims, 13 Drawing Sheets

(56) References Cited

U.S. PATENT DOCUMENTS

| | | |
|---|---|---|
| 2012/0247096 A1 | 10/2012 | Gerber et al. |
| 2014/0217735 A1 | 8/2014 | Chen |
| 2014/0217737 A1 | 8/2014 | Castillo |
| 2016/0252071 A1* | 9/2016 | Phillips ................ H02M 7/066 290/50 |
| 2017/0101976 A1* | 4/2017 | Park ........................ F03B 17/04 |
| 2017/0198401 A1 | 7/2017 | Phillips |
| 2017/0234291 A1 | 8/2017 | Noia |
| 2018/0045166 A1 | 2/2018 | Mundon et al. |
| 2018/0251713 A1 | 9/2018 | Angelescu et al. |
| 2018/0355837 A1 | 12/2018 | Bonutti et al. |
| 2019/0353139 A1 | 11/2019 | Sheldon-Coulson et al. |
| 2020/0056578 A1 | 2/2020 | Sheldon-Coulson et al. |

* cited by examiner

WAVE ENERGY HARVESTER

BACKGROUND

Wave energy may be extracted to generate electricity. Some known wave energy harvesters are large, complex structures with rigid components that are inflexible, unwieldy, and/or difficult to use or modify. For example, at least some known wave energy harvesters include hinged or rotatably-linked parts that respond to a shape or curvature of the waves and/or gyroscopes that respond to a direction of the waves. However, such wave energy harvesters capture only a small portion of the available power in waves.

SUMMARY

Aspects of the disclosure enable wave energy harvesters to efficiently convert wave energy to electrical energy. In one aspect, a linear generator is provided. The linear generator includes one or more helices, and one or more magnet members movable relative to a first helix to generate electric energy within the first helix. The first helix includes a first coil. The first helix and/or the magnet members has a density less than that of water such that the first helix and/or the magnet members has buoyant properties when the linear generator is at least partially submerged in the water.

In another aspect, a wave energy harvester is provided. The wave energy harvester includes a reservoir for storing water, one or more linear generators, and one or more conduits coupling the reservoir and the linear generators such that the conduits are configured to channel the water from the reservoir to the linear generators. The linear generators include one or more inductive coils, and one or more magnet members configured to move relative to the inductive coils to generate electric energy within the inductive coils. At least a first coil of the inductive coils has a helical configuration. The inductive coils and/or the magnet members have a density less than that of the water such that the inductive coils and/or the magnet members have buoyant properties when the linear generator is at least partially submerged in the water.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF THE FIGURES

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

Like numbers (e.g. 100 and 300, 112 and 600, etc.) in the FIGS. refer to similar elements. Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

DETAILED DESCRIPTION

The subject matter described herein relates to wave energy harvesters and, more particularly, to a linear generator that may be used to harvest wave energy. Examples of the disclosure include one or more inductive coils arranged in a helical configuration, and one or more magnet members movable relative to the inductive coils to generate electric energy within the inductive coils. The examples described herein efficiently convert mechanical energy in water bodies (e.g. wave energy) into electric energy.

Advantages of the examples described herein include effective energy generation owing to the helical configuration of the inductive coils and a longer stroke length regarding the relative movement between the magnet members and the inductive coils, in part due to the helical configuration of the coil. Another advantage of the examples described herein include a streamlined, efficient design which may have fewer moving parts compared to larger, more-complicated wave energy harvesters. The teachings set forth in U.S. Patent Publication No. 2018/0355838, filed Jun. 8, 2018, and 2003/0181800, filed Mar. 20, 2002, are herein incorporated by reference in their entireties.

Figure 1:
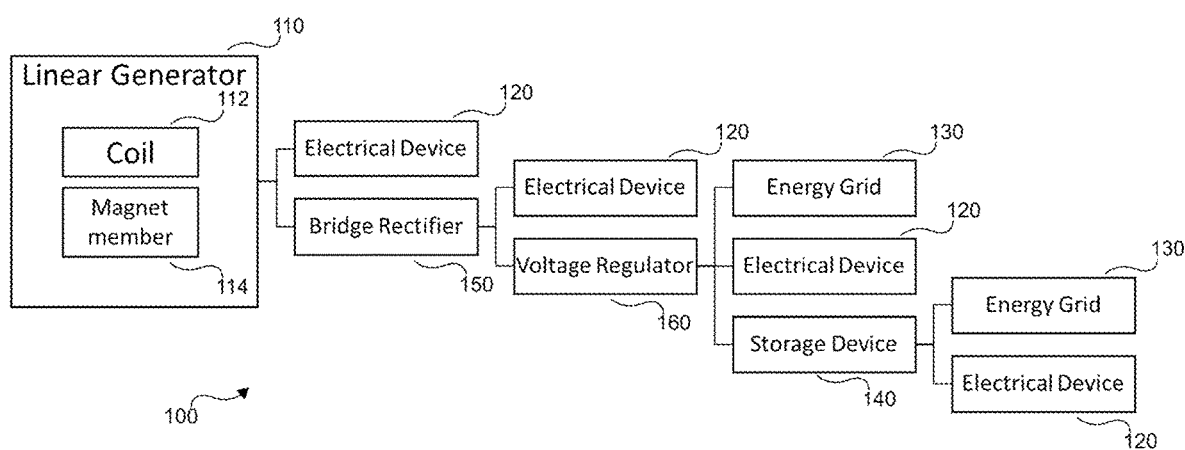
FIG. 1 is a block diagram of an example system that may be used to harvest wave energy.

FIG. 1 shows an example wave energy harvester 100 including one or more linear generators 110 that convert mechanical energy to electrical energy. A linear generator 110 includes a solenoid or coil 112 and a magnet member 114 that is moveable relative to the coil 112. The magnet member 114 may move back and forth along a predetermined path relative to the coil 112, for example, to change a magnetic flux passing through the coil 112, inducing an electric current in the coil 112 (e.g., via Faraday's law of induction). The coil 112 may be fabricated from or coated with one or more ferromagnetic materials (e.g., iron). The magnet member 114 may be or include a permanent magnet and/or an electromagnet.

The wave energy harvester 100 is coupleable to one or more electrical devices 120 (e.g., a light) configured to use or consume the electrical energy generated by the linear generators 110. Additionally or alternatively, the wave energy harvester 100 may be coupled to an energy grid 130 and/or a storage device 140 (e.g., a battery). In some examples, the wave energy harvester 100 includes or is coupled to a bridge rectifier 150 that converts the electric current to a direct current (DC) and/or a voltage regulator 160 that controls a voltage level of the electric current.

Figure 2:
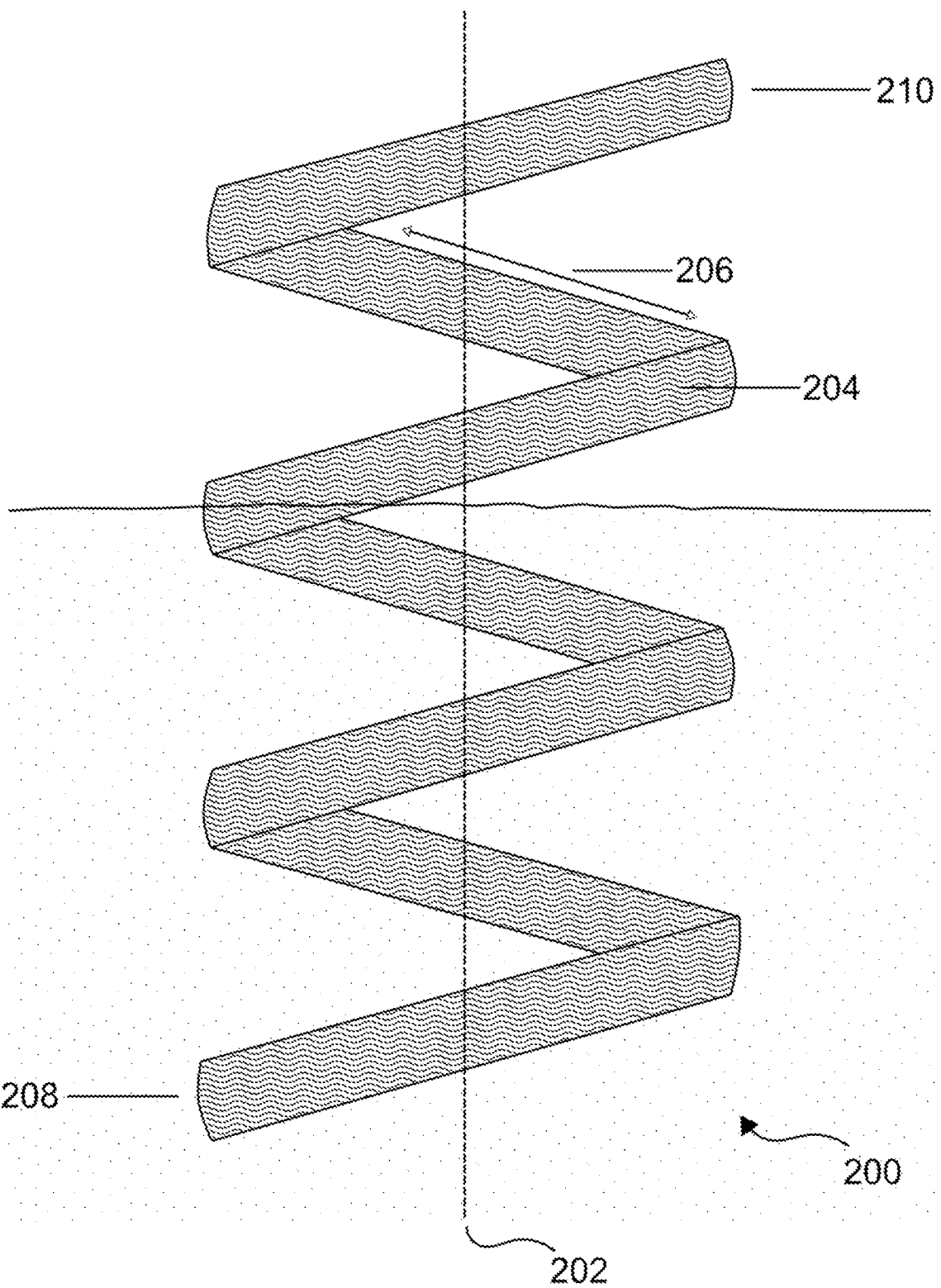
FIG. 2 is an elevation view of an example helical coil that may be used to harvest wave energy.
Figure 3:
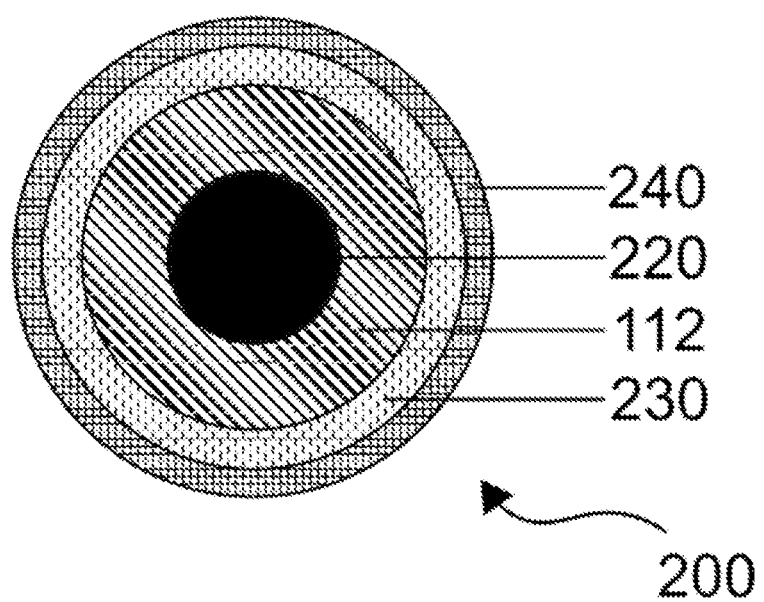
FIG. 3 is a cross section view of the helical coil shown in FIG. 2.

FIGS. 2 and 3 show a helix 200 including the coil 112. As shown in FIG. 2, the helix 200 extends or spirals about a longitudinal axis 202. The helix 200 includes a plurality of curves or turns 204 extending an axial length 206 of the helix 200 between a first end 208 and a second end 210. As shown in FIG. 2, the helix 200 may have a curvature and torsion that are constant or substantially constant along the axial length 206. Alternatively, the curvature and/or torsion of the helix 200 may vary. While the helix 200 shown in FIG. 2 is a right-handed helix, examples of the disclosure may include left-handed and/or right-handed helices. With the line of sight along the longitudinal axis 202, if a clockwise screwing motion moves the turns 204 away from the observer, then the helix 200 is a right-handed helix; if a clockwise screwing motion moves the turns 204 towards the observer, then the helix 200 is a left-handed helix.

As shown in FIG. 3, the coil 112 is disposed radially outward of a core 220 of the helix 200. The coil 112 may extend or spiral about the core 220, for example, along the axial length 206 of the helix 200. In some examples, the core 220 is hollow. That is, the coil 112 may define a space extending axially along the axial length 206 of the helix 200. Alternatively, the core 220 may be or include a rod fabricated from or coated with one or more ferromagnetic materials (e.g., iron) extending axially along the axial length 206 of the helix 200. In this manner, the core 220 may be a conductive core.

In some examples, the helix 200 includes an insulator layer 230 and/or a conductor layer 240 disposed radially outward of the coil 112. The insulator layer 230 may separate the coil 112, for example, from the conductor layer 240. As shown in FIG. 3, the core 220, coil 112, insulator layer 230, and/or conductor layer 240 may be arranged in a concentric or substantially concentric configuration.

Figure 4:
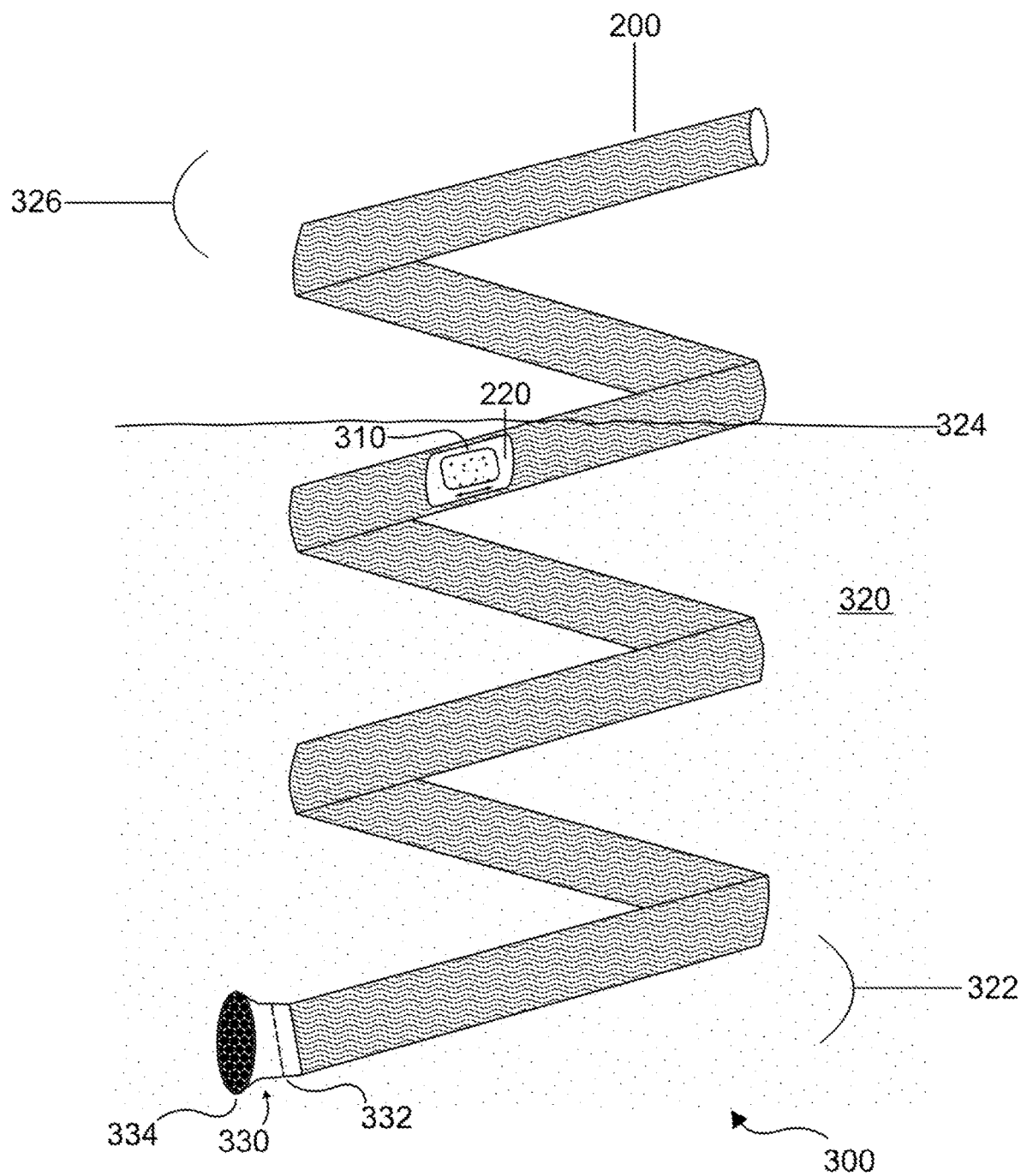
FIG. 4 is a partial cutaway view of the helical coil shown in FIG. 2 with an example magnet member and an example filter assembly.

FIG. 4 shows an example linear generator 300 (e.g., linear generator 110) including the helix 200 and a magnet member 310 (e.g., magnet member 114) disposed within the core 220 of the coil 112. The magnet member 310 is moveable within the core 220 axially along the axial length 206 of the helix 200 (e.g., spiraling about the longitudinal axis 202). The magnet member 310 is electromagnetically coupled to the coil 112 such that movement of the magnet member 310 within the core 220 induces an electric current in the coil 112.

The helix 200 may include openings at the first end 208 and second end 210 that allow fluid to enter the core 220. As shown in FIG. 4, the linear generator 300 may be positioned in a fluid 320 (e.g., water) such that a first portion 322 of the linear generator 300 is below a fluid surface 324 (e.g., submerged in the fluid 320) and a second portion 326 of the linear generator 300 is above the fluid surface 324. In this manner, a first fluid (e.g., fluid 320) may enter or leave the core 220 via an opening at the first end 208, and a second fluid (e.g., air) may enter or leave the core 220 via an opening at the second end 210 (e.g., an air vent). The air vent allows for equalizing pressure as fluid 320 enters or leaves the core 220.

In some examples, the linear generator 300 is configured to have buoyant properties when positioned in fluid 320. For example, the helix 200 and/or magnet member 310 may have an average density that is less than that of the fluid 320. In this manner, the helix 200 and/or magnet member 310 may have a tendency or capacity to float when the linear generator 300 is positioned in fluid 320. In some examples, a density of the helix 200 is different from a density of the magnet member 310.

The linear generator 300 may include or be coupled to a filter assembly 330 that allows a fluid (e.g., fluid 320) to pass therethrough (e.g., to or from the core 220) while restricting or preventing a solid (e.g., magnet member 310) from passing therethrough. The filter assembly 330 may be coupled, for example, to the first end 208 and/or second end 210 of the helix 200. As shown in FIG. 4, the filter assembly 330 may include a body 332 and a filter medium 334 coupled to the body 332. In some examples, the body 332 defines a channel in fluid communication with the core 220, and/or the filter medium 334 extends at least partially across the channel to restrict or prevent the magnet member 310 from leaving the core 220 while filtering fluid (e.g., fluid 320) entering or leaving the core 220.

Figure 5:
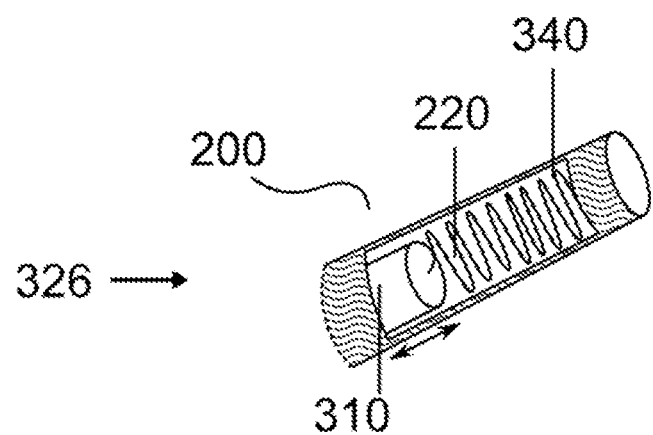
FIG. 5 is a detailed partial cutaway view of the helical coil shown in FIG. 2 with the magnet member shown in FIG. 4 and an example resilient member.

FIG. 5 shows an end (e.g., first end 208, second end 210) of the helix 200 including or coupled to one or more resilient members 340. The resilient member 340 is positionable to control a movement of the magnet member 310 within the core 220. For example, when the magnet member 310 moves away from the resilient member 340, the resilient member 340 may urge the magnet member 310 to move toward the resilient member 340. Additionally or alternatively, when the magnet member 310 moves towards the resilient member 340, the resilient member 340 may urge the magnet member 310 to move away from the resilient member 340. In some examples, the resilient member 340 is moveable between a neutral configuration and a biased configuration (e.g., expanded configuration, contracted configuration). For example, a magnet member 310 securely coupled to the resilient member 340 may urge the resilient member 340 between a neutral configuration and a biased configuration as the magnet member 310 moves within the core 220. For another example, a magnet member 310 otherwise-free from the resilient member 340 may come in contact with the resilient member 340 to move the resilient member 340 from a neutral configuration to a biased configuration. Example resilient members 340 may be or include a spring (e.g., coil, leaf), a magnet, an elastic material, and the like.

Figure 6:
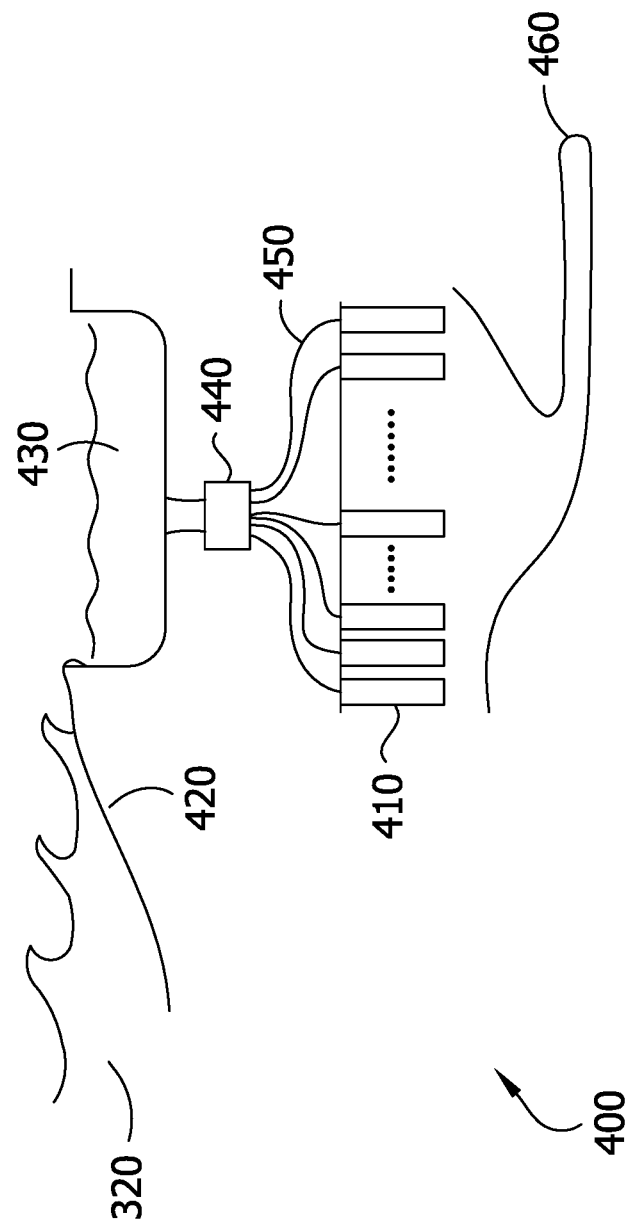
FIG. 6 is a schematic diagram of an example system that may be used to harvest wave energy.

FIG. 6 shows an example energy harvester 400 (e.g., wave energy harvester 100) including a plurality of linear generators 410 (e.g., linear generator 110). Waves or tides may cause changes in a fluid surface 324. Fluid 320 that exceeds or overcomes a barrier 420 (e.g. a ramp, a wall, etc.) may enter a reservoir 430 and be stored therein. In this manner, the barrier 420 may control a first quantity of fluid 320 entering the reservoir 430. The energy harvester 400 includes a valve 440 at a lower portion of the reservoir 430. The valve 440 may be used to selectively channel fluid 320 from the reservoir 430 to one or more linear generators 410 via one or more flow lines 450 extending therebetween. In this manner, the valve 440 may control a second quantity of fluid 320 channeled from the reservoir 430.

A flow of fluid 320 channeled or directed toward a linear generator 410 may urge a magnet member 310 within the core 220 downward (e.g., a force of the fluid flow may be greater than a buoyant force of the magnet member 310). When the fluid flow is selectively decreased or stopped (e.g., by the valve 440), the magnet member 310 may move back upward. Fluid 320 may leave the energy harvester 400 through a drain 460. In some examples, the resilient member 340 facilitates movement of the magnet member 310 within the core 220. For example, the resilient member 340 may be or include an extension spring securely coupled to the magnet member 310 at the second end 210 of the helix 200. The resilient member 340 may move toward an expanded biased configuration when the flow of fluid 320 urges the magnet member 310 downward and urge the magnet member 310 upward when the fluid flow is selectively decreased or stopped. Additionally or alternatively, the valve 440 may be selectively operated to generate a fluid flow at a resonant frequency of the linear generator 410. For example, the valve 440 may be opened or closed to time a pulse of fluid 320 that allows the magnet member 310 to move efficiently between the first end 208 and the second end 210.

Figure 7:
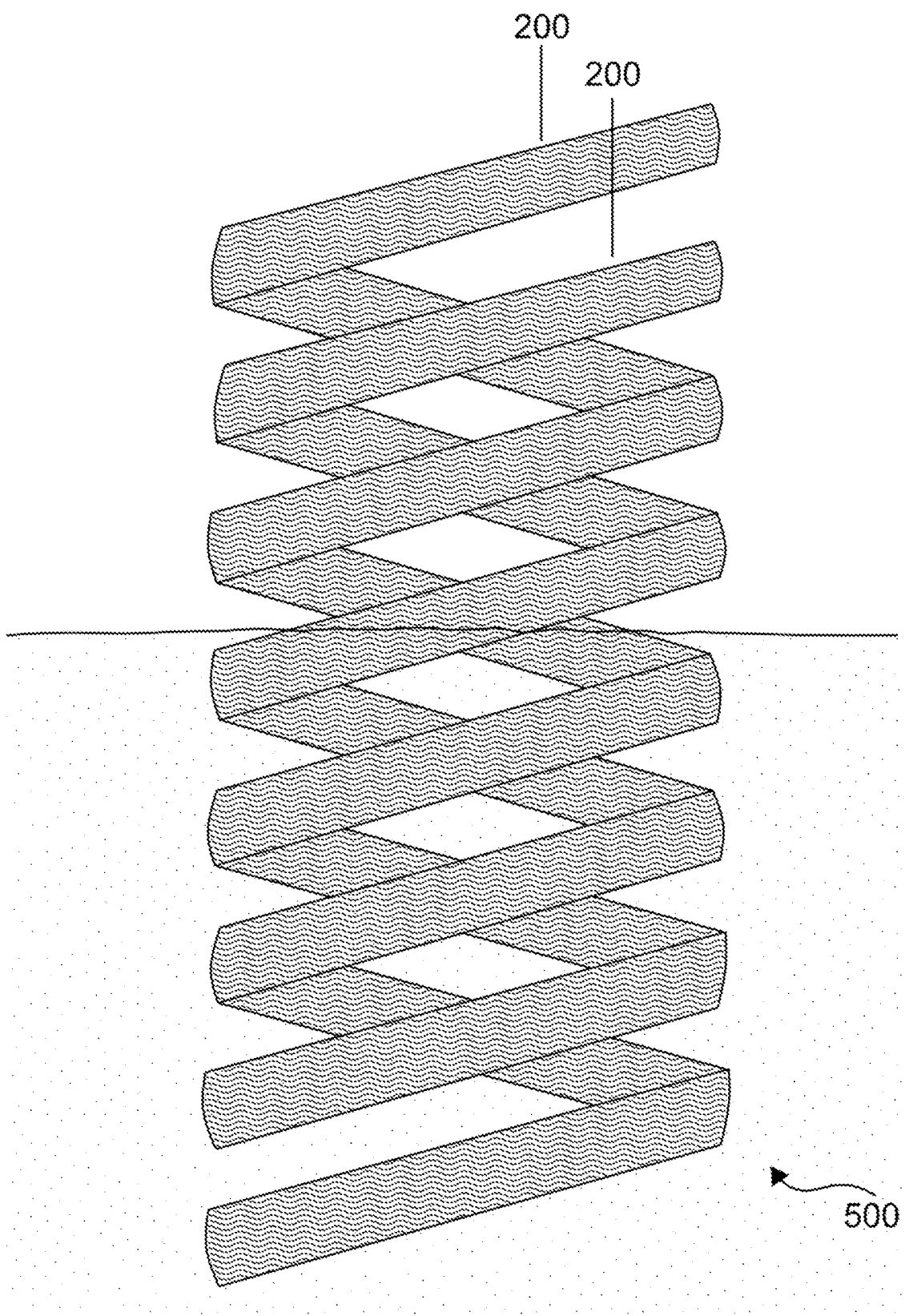
FIG. 7 is an elevation view of an example coil arrangement including a plurality of helical coils, such as the helical coil shown in FIG. 2.

FIG. 7 shows an example coil arrangement 500 including a plurality of helices 200. In some examples, the linear generator 300 (e.g., linear generator 110, linear generator 300, linear generator 410) includes one or more helices 200. As shown in FIG. 7, the helices 200 may have a same or substantially similar longitudinal axis 202, differing by a translation along the longitudinal axis 202. Each helix 200 may have a same or a substantially similar axial length 206, curvature, and/or torsion and be fabricated from a same or a substantially similar combination of materials. Alternatively, one helix 200 may have an axial length 206, curvature, torsion, and/or combination of materials than that of another helix 200.

Magnet members 114 (e.g., magnet member 310) are moveable relative to the helices 200 to generate electric energy. The helices 200 may be electrically connected in a series configuration such that movement of one or more magnet members 310 relative to the helices 200 produces a single voltage pulse with a plurality of periods. Alternatively, the helices 200 may be electrically insulated from each other such that movement of the magnet members 310 relative to the helices 200 produces a respective voltage pulse for each helix 200. While the coil arrangement 500 shown in FIG. 7 includes a double helix (i.e., two helices 200), one skilled in the art would understand that the coil arrangement 500 may include any number of helices 200 having any configuration that enables the linear generator 110 and/or linear generator 300 to function as described herein.

Figure 8:
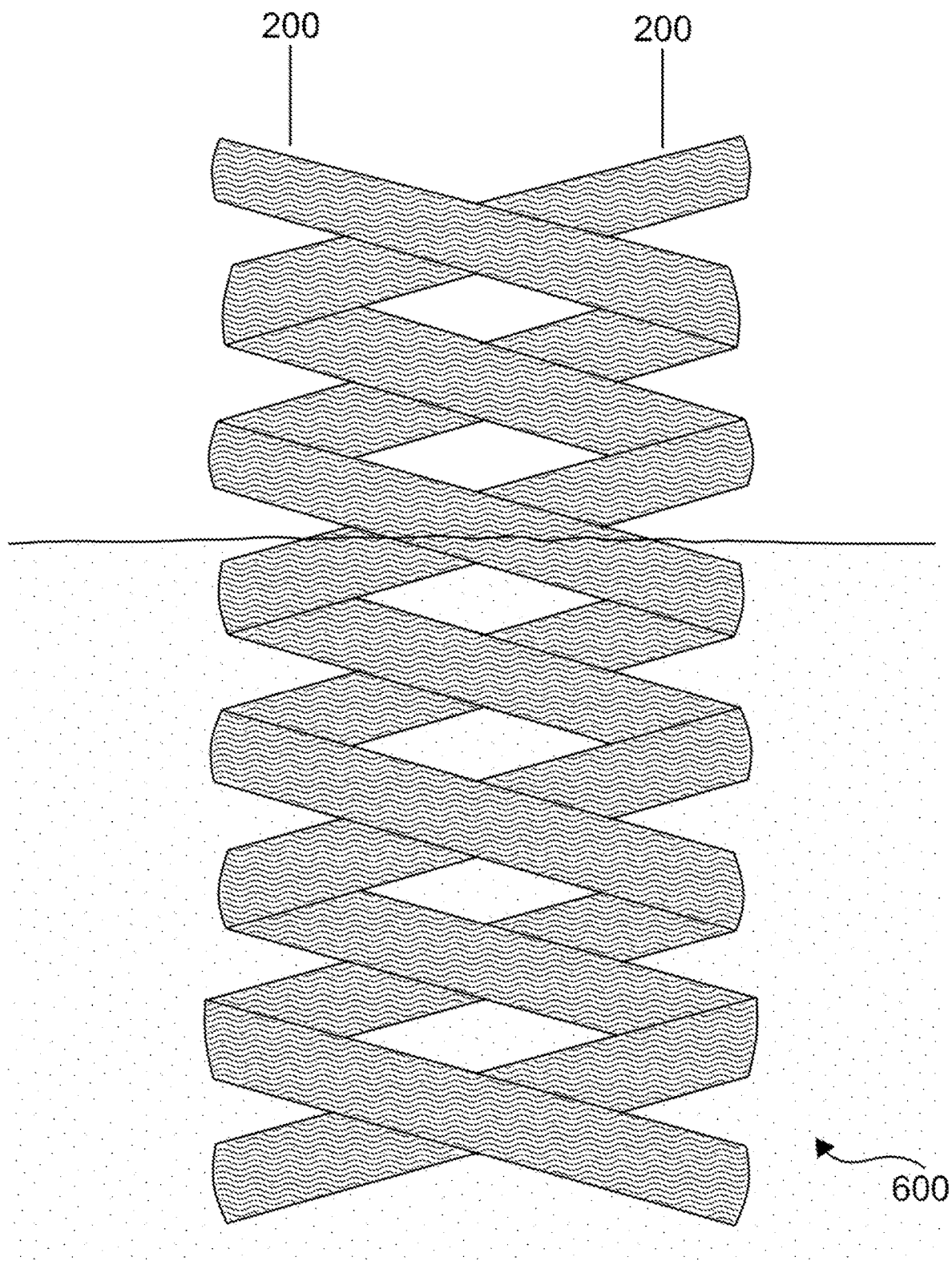
FIG. 8 is an elevation view of another example coil arrangement including a plurality of helical coils, such as the helical coil shown in FIG. 2.

FIG. 8 shows another example coil arrangement 600 including a plurality of helices 200. The coil arrangement 600 is substantially similar to the coil arrangement 500 described above other than the coil arrangement 500 including helices 200 having the same handedness (i.e., the helices 200 are coiled in a common direction) and the coil arrangement 600 including helices 200 having differing handedness (i.e., the helices 200 are coiled in opposite directions).

Figure 9:
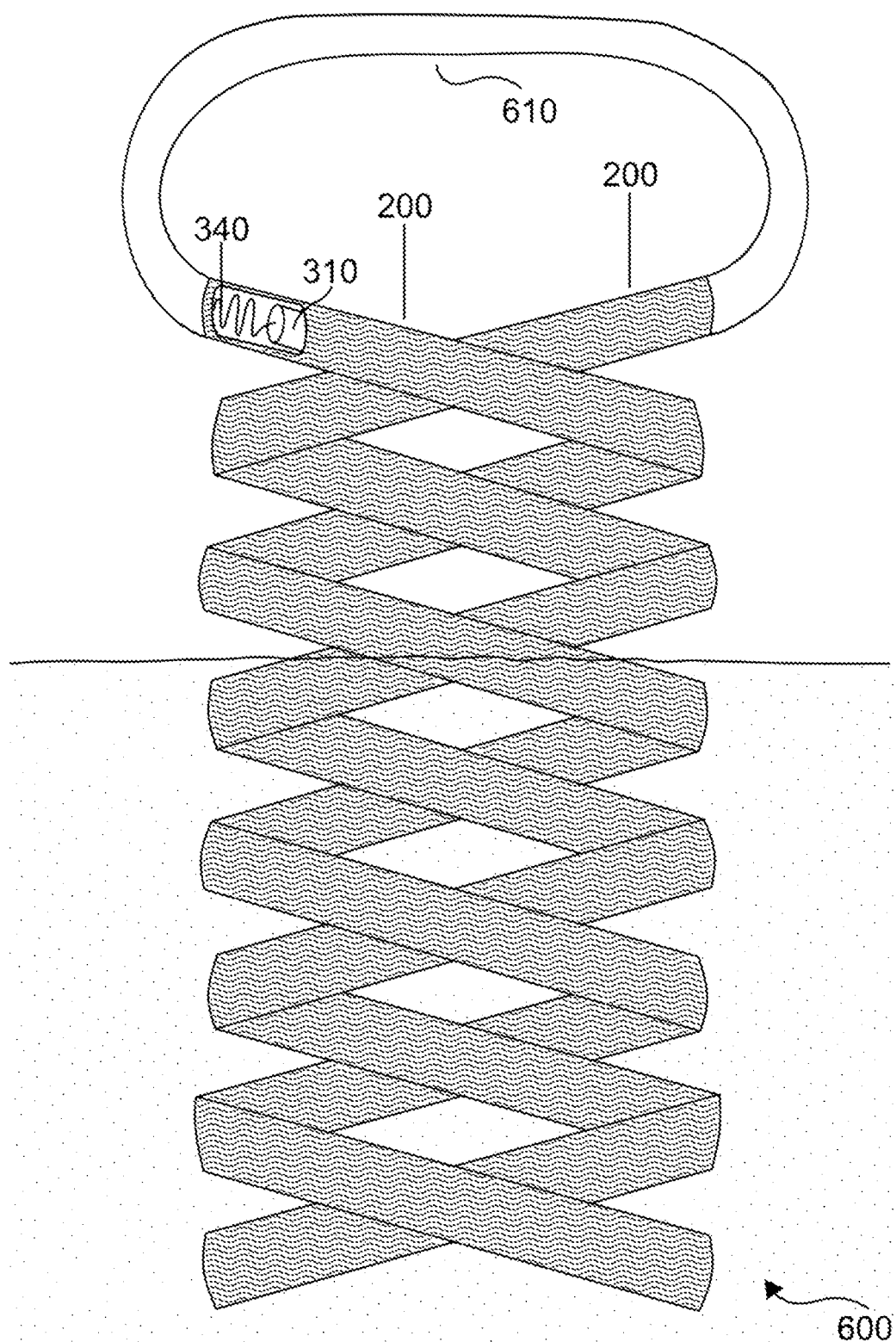
FIG. 9 is an elevation view of the coil arrangement shown in FIG. 8 with an example fluid duct coupling the helical coils.

FIG. 9 shows the coil arrangement 600 with a fluid duct 610 coupling the helices 200 to each other at their second ends 210 such that fluid 320 may pass between the helices 200. In this manner, the first helix 200 may define a first channel and the second coil may define a second channel in fluid communication with the first channel. In some examples, a first helix 200 includes a first magnet member 310 securely coupled to a first resilient member 340, and a second helix 200 includes a second magnet member 310 free from a second resilient member 340. At rest, the first magnet member 310 is at the second end 210 of the first helix 200, and the second magnet member 310 is at the first end 208 of the second helix 200. When the coil arrangement 600 is positioned in a body of fluid 320, the second magnet member 310 may move upward (e.g., float) within the core 220. Fluid 320 moving upward through the core 220 of the second helix 200 (e.g., from waves or tides causing movement in the fluid 320) may urge the second magnet member 310 to move upward. Additionally, fluid 320 moving upward through the core 220 of the second helix 200 may be channeled through the fluid duct 610 and downward through the core 220 of the first helix 200, urging the first magnet member 310 downward. When the fluid flow is selectively decreased or stopped, the first magnet member 310 may move back upward and/or the second magnet member 310 may move back downward.

Figure 10:
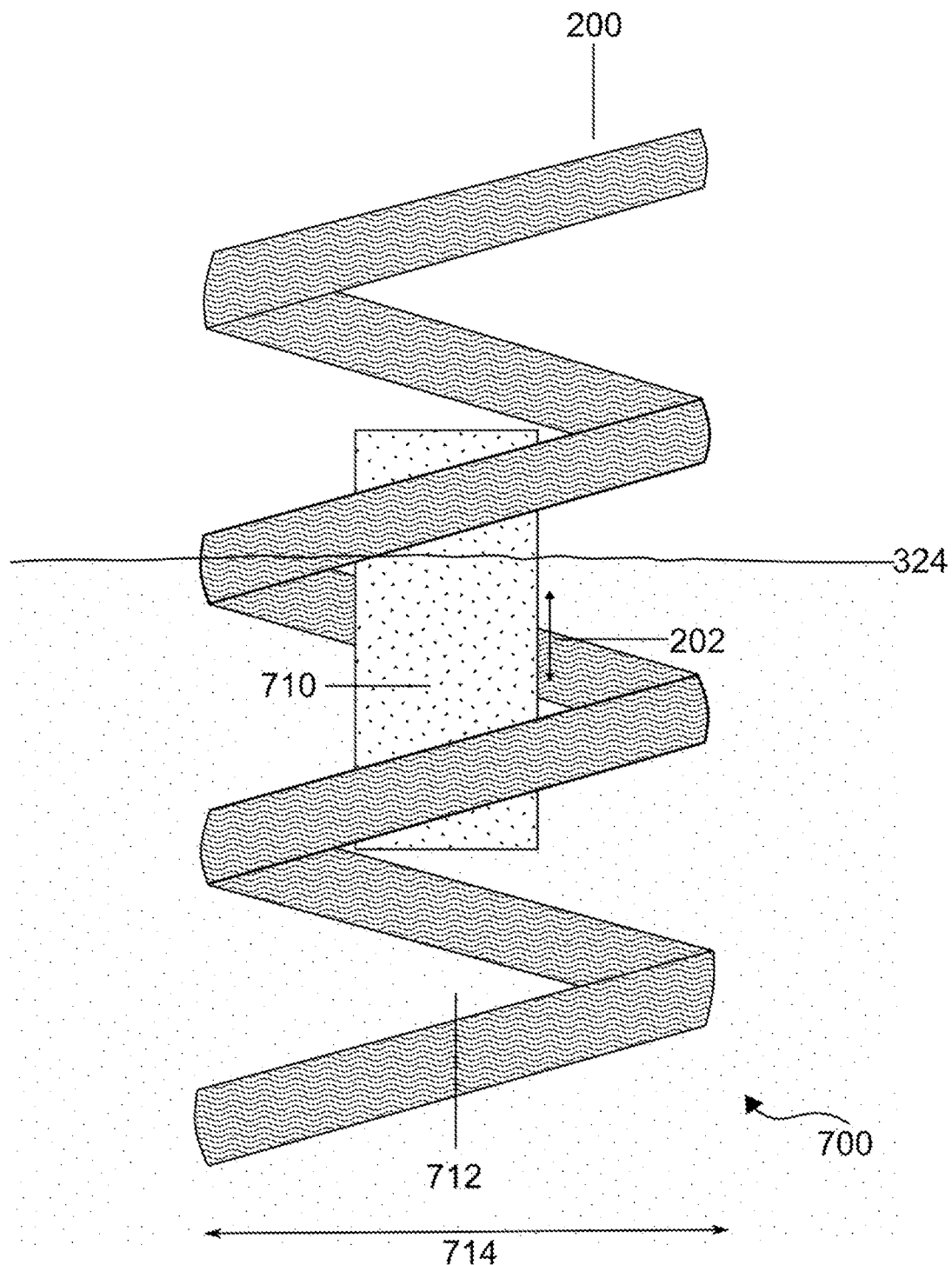
FIG. 10 is an elevation view of the helical coil shown in FIG. 2 with another example magnet member.

FIG. 10 shows another example linear generator 700 (e.g., linear generator 110) including the helix 200 and a magnet member 710 (e.g., magnet member 114) within a central region 712 defined by a helix diameter 714. The magnet member 710 is moveable relative to the helix 200 within the central region 712 (e.g., along the longitudinal axis 202). The magnet member 710 is electromagnetically coupled to the helix 200 such that movement of the magnet member 710 relative to the helix 200 produces a current in the helix 200.

The linear generator 700 may be configured to have buoyant properties when positioned in fluid 320. For example, the helix 200 and/or magnet member 710 may have an average density that is less than that of the fluid 320. In this manner, the helix 200 and/or magnet member 710 may have a tendency or capacity to float when the linear generator 700 is positioned in fluid 320. In some examples, a density of the helix 200 is different from a density of the magnet member 710.

Figure 11:
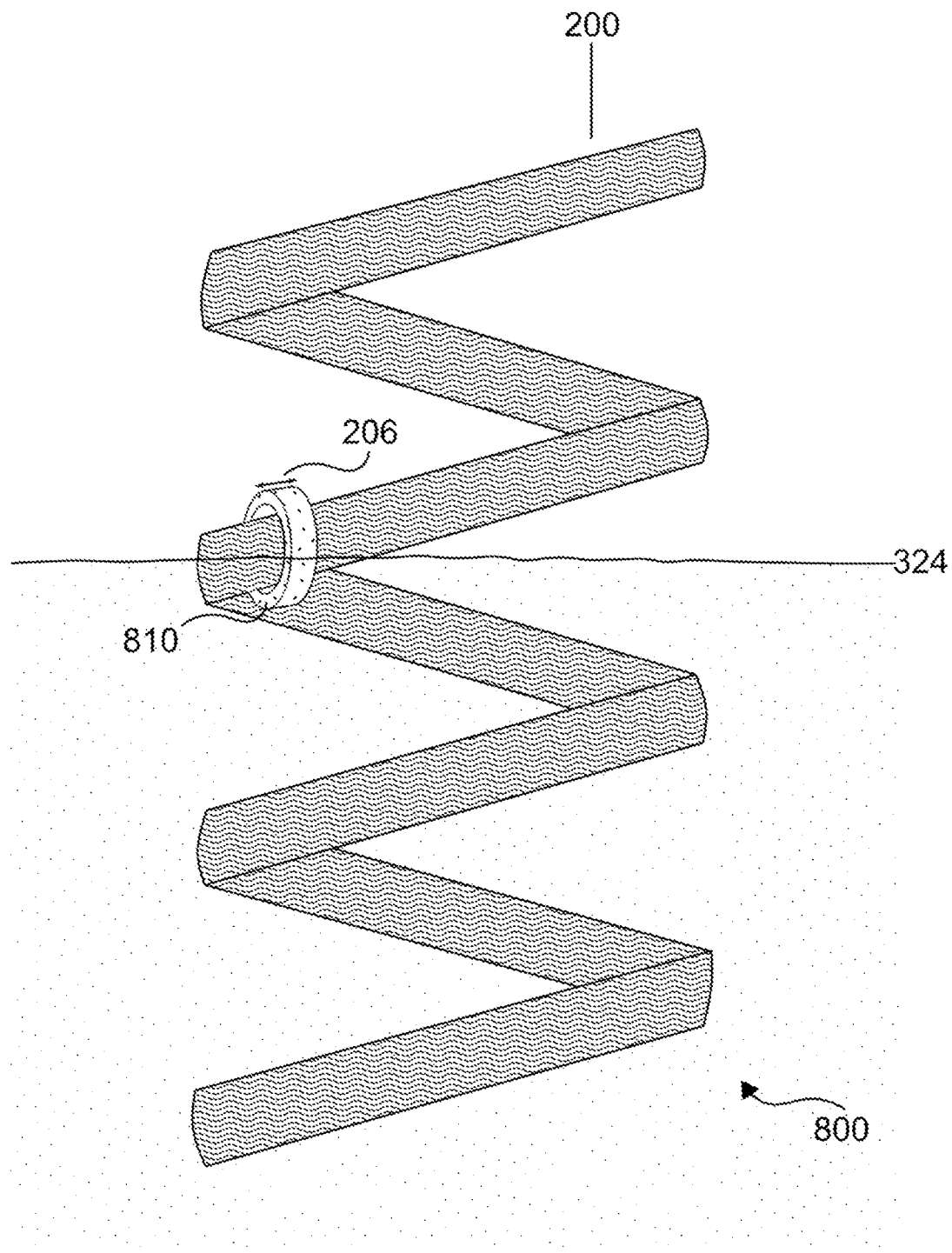
FIG. 11 is an elevation view of the helical coil shown in FIG. 2 with yet another example magnet member.

FIG. 11 shows yet another example linear generator 800 (e.g., linear generator 110) including the helix 200 and a magnet member 810 (e.g., magnet member 114) circumscribing or extending at least partially about the helix 200. The magnet member 810 is moveable relative to the helix 200 along an axial length 206 of the helix 200 (e.g., helically about the longitudinal axis 202). The magnet member 810 is electromagnetically coupled to the helix 200 such that movement of the magnet member 810 relative to the helix 200 produces a current in the helix 200.

The linear generator 800 may be configured to have buoyant properties when positioned in fluid 320. For example, the helix 200 and/or magnet member 810 may have an average density that is less than that of the fluid 320. In this manner, the helix 200 and/or magnet member 810 may have a tendency or capacity to float when the linear generator 800 is positioned in fluid 320. In some examples, a density of the helix 200 is different from a density of the magnet member 810.

Figure 12:
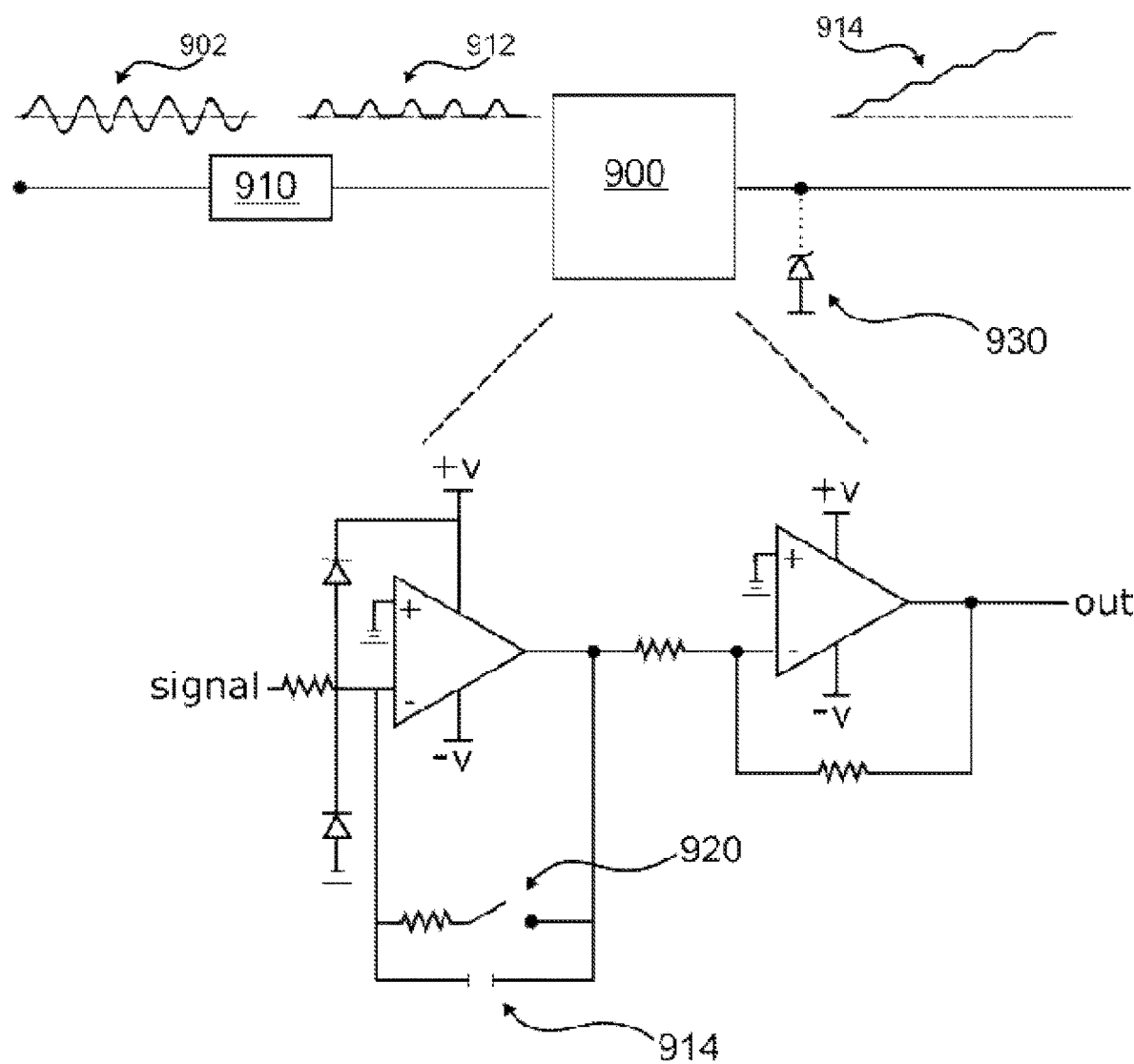
FIG. 12 is a schematic view of an example circuit including an energy harvesting charge pump that may be used with the wave energy harvesters described herein.

FIG. 12 shows an energy harvesting charge pump 900 that may be used with the wave energy harvesters described herein. As a magnet member 114 (e.g., magnet member 310, magnet member 710, magnet member 810) moves relative to a coil 112, an electric current is induced in the coil 112, resulting voltage pulses 902 (shown also in FIG. 13). The voltage pulses 902 may have an amplitude (e.g., a peak-to-peak amplitude between a peak or high amplitude value and a trough or low amplitude value). Parameters of the voltage pulses 902 may vary depending on the properties of the coil 112 and/or magnet member 114.

Figure 13:
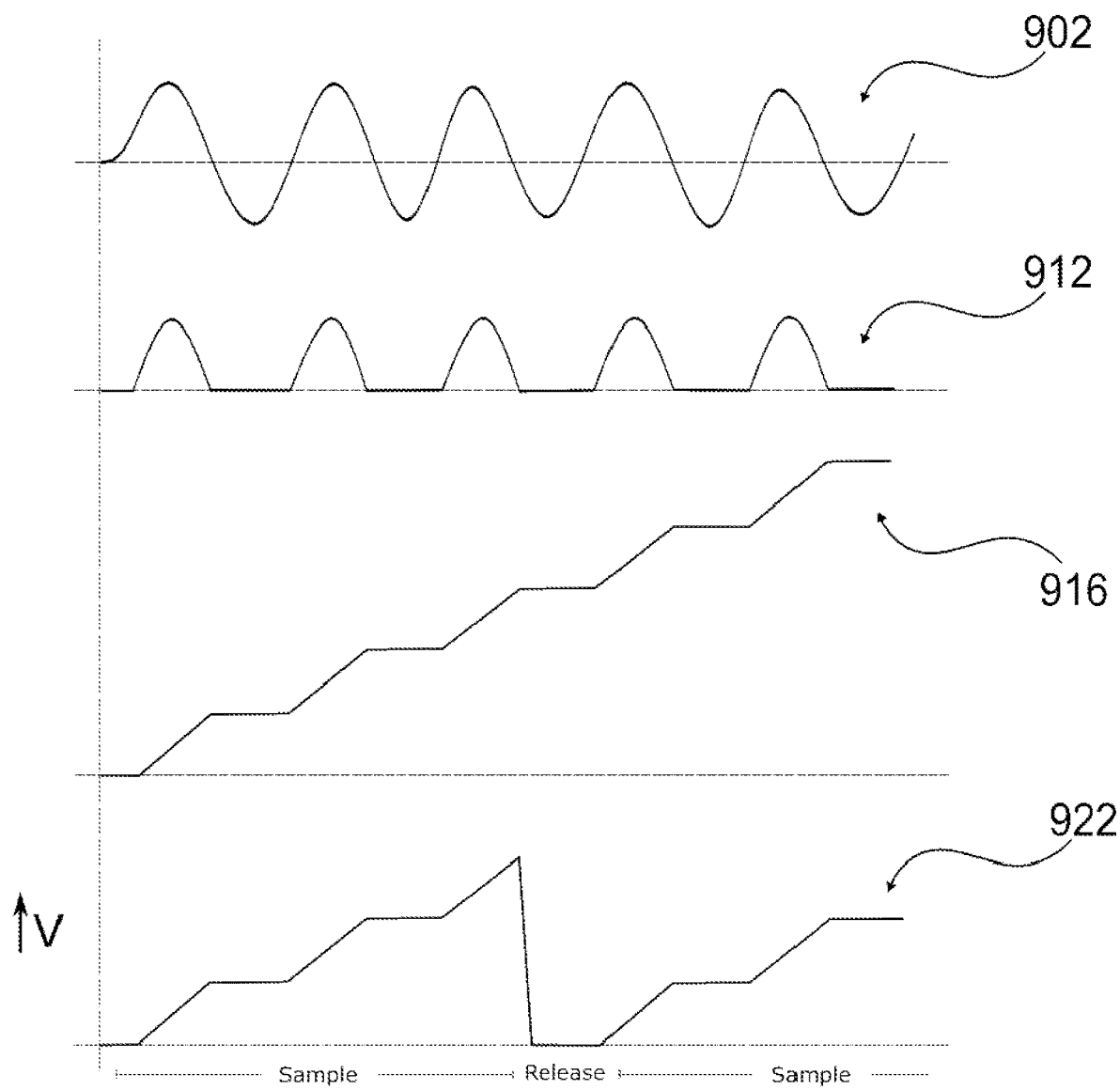
FIG. 13 includes a plurality of voltage graphs of the circuit shown in FIG. 12.

In some examples, a damper 910 may be used to set or fix the trough to a defined value such that the voltage pulses 902 result in only positive voltage pulses 912 (shown also in FIG. 13). Alternatively, the damper 910 may be used to set or fix the peak to a defined value such that the voltage pulses 902 result in only negative voltage pulses. The voltage pulses (e.g. 902, 912) may be applied to the charge pump 900 which includes one or more capacitors 914 configured to store energetic charge. The charge pump 900 may be used to increase voltage 916 (shown also in FIG. 13). Alternatively, the charge pump 900 may be used to decrease voltage. Voltages may be used and/or stored (e.g., at a large capacitor) for voltage supply to a charge circuit.

In some examples, the charge pump 900 may be switched between a charging state, in which a first capacitor may be charged or replenished to a desired voltage, and a charge transfer state, in which the first capacitor transfers some of its charge to a second capacitor. In some examples, the charge pump 900 may include a sample and hold feature 920 that facilitates accumulating or sampling energetic charge to a desired voltage 922 and then releasing the charge (e.g., returning the voltage 922 to zero volts, shown also in FIG. 13) once the desired voltage 922 is reached, resulting in a higher voltage 922 pulsing circuit. In some examples, one or more diodes 930 protect against over voltage.

The linear generators described herein includes one or more inductive coils and one or more magnet members configured to move relative to the inductive coils to generate electric energy within the one or more inductive coils. For any of the linear generators described herein, the number of helices and their configuration may be selected to increase the electrical energy output and reduce electromagnetic interference.

To optimize a helical linear generator, the magnetic fields of the generator must be optimized to minimize parasitic interactions and maximize outputs. When there is a single winding in the generator, there will be a single voltage pulse as the magnet travels through the windings. If 2 sets of windings were used, there would be 2 pulses, and if 3 sets there would be three pulses, and so on. Each set of windings that the magnet passes through acts as an individual inductor. By creating a series of windings, and spacing them such that the reversed magnetic field generated on the adjacent layer of the helical windings are prevented the efficiency of the generator can be increased.

In another embodiment, 4 coils could be wired in series, such that coil 1 was connected to coil 3, and coil 2 was connected to coil 4. The series coils would be physically separated from each other in the helical generator, and all 4 coils would be aligned such that the magnet would pass through them sequentially as it moved through the generator. This would generate 2 pulses on the first set of coils, and 2 pulses on the second set of coils. It is also considered any number of coils can be added to the series connection, as long as they were physically isolated, and additional series groups could be created to optimize the magnetic field interactions in the helix.

In another embedment each set of coils could be ran through a full bridge rectifier with the outputs combined to create a DC output. It is known in the art that the rule of thumb for coil length is 3 times the length of the magnet. Additional series of coils and rectifiers could be added to optimize the individual coils length in each series.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While aspects of the disclosure have been described in terms of various examples with their associated operations, a person skilled in the art would appreciate that a combination of operations from any number of different examples is also within the scope of the aspects of the disclosure.

What is claimed is:

1. A linear generator comprising:
one or more helices movable in response to an external mechanical energy source, wherein a first helix of the one or more helices includes a first coil capable of having an electric current induced therein, and wherein the first helix has a hollow core;
one or more magnet members movable relative to the first coil along a predetermined path defined by the first helix to induce the electric current in the first coil, wherein movement of the first helix in response to the external mechanical energy source causes the one or more magnet members to move relative to the first coil, and wherein a first magnet member of the one or more magnet members is positioned within the hollow core of the first helix and movable relative to the first coil within the hollow core of the first helix; and
one or more resilient members in the hollow core, the one or more resilient members configured to urge the one or more magnet members to move relative to the first helix within the hollow core thereof.

2. The linear generator of claim 1, wherein the one or more helices includes a second helix including a second coil.

3. The linear generator of claim 2, wherein the first helix defines a first channel and the second helix defines a second channel in fluid communication with the first channel.

4. The linear generator of claim 2, wherein the first helix is electrically coupled to the second helix in a series configuration.

5. The linear generator of claim 2, wherein the first helix and the second helix are coiled in opposite directions.

6. The linear generator of claim 2, wherein the first helix and the second helix are coiled in a common direction.

7. The linear generator of claim 1, wherein the first helix includes a conductive core.

8. The linear generator of claim 1, wherein the first helix is coated with a ferromagnetic material.

9. The linear generator of claim 1, wherein the first helix defines an air vent in fluid communication with the hollow core.

10. The linear generator of claim 1, further comprising a bridge rectifier coupled to the first helix, the bridge rectifier configured to convert the electric current induced in the first coil to a direct current.

11. The linear generator of claim 1, wherein at least one of the one or more magnet members at least partially circumscribes the first helix, the one or more magnet members movable along the first helix in a helical direction.

12. The linear generator of claim 1, wherein at least one of the one or more magnet members extends substantially along a longitudinal axis of the first helix, the at least one of the one or more magnet members movable along the longitudinal axis of the first helix.

13. A wave energy harvester comprising:
a reservoir for storing water;
at least one linear generator comprising:
an inductive coil capable of having an electric current induced therein, wherein the inductive coil is configured to move in response to mechanical energy provided thereto by movement of the water in the reservoir, and
one or more magnet members configured to move relative to the inductive coil to induce the electric current in the inductive coil; and
a resilient member configured to urge the one or more magnet members away from the resilient member when the movement of the inductive coil in response to the mechanical energy provided by the movement of the water causes the one or more magnet members to move toward the resilient member;
wherein the inductive coil has a helical configuration, and
wherein the movement of the inductive coil in response to the mechanical energy provided by the movement of the water channeled from the reservoir causes the one or more magnet members to move along a predetermined path defined by the helical configuration.

14. The wave energy harvester of claim 13, further comprising one or more of a barrier that controls a first quantity of water entering the reservoir and a valve in fluid communication with the reservoir that controls a second quantity of water channeled from the reservoir to the at least one linear generator.

15. A linear generator comprising:
a helix movable in response to an external mechanical energy source, wherein the helix includes a coil capable of having an electric current induced therein;
a magnet member movable relative to the coil along a predetermined path defined by the helix to induce the electric current in the coil, wherein movement of the helix in response to the external mechanical energy source causes the magnet member to move relative to the coil along the helix; and
a resilient member configured to urge the magnet member away from the resilient member when the movement of the helix in response to the external mechanical energy source causes the magnet member to move along the helix toward the resilient member.

16. The linear generator of claim 15, wherein the magnet member at least partially circumscribes the helix and is movable along the helix in a helical direction.

17. The linear generator of claim 15, wherein the resilient member comprises at least one of a permanent magnet, an electromagnet powered by an external energy source, and an electromagnet powered by the electric current induced in the coil.

* * * * *